United States Patent
Mizuno et al.

(10) Patent No.: US 10,256,450 B2
(45) Date of Patent: *Apr. 9, 2019

(54) LAMINATED POROUS MEMBRANE, PROCESS FOR MANUFACTURING SAME AND SEPARATOR FOR BATTERY

(71) Applicant: Toray Battery Separator Film Co., Ltd., Nasushiobara-shi (JP)

(72) Inventors: Naoki Mizuno, Nasushiobara (JP); Koichi Matano, Nasushiobara (JP); Ken Shimizu, Nasushiobara (JP)

(73) Assignee: Toray Industries, Inc. (JP)

( * ) Notice: Subject to any disclaimer, the term of this patent is extended or adjusted under 35 U.S.C. 154(b) by 133 days.

This patent is subject to a terminal disclaimer.

(21) Appl. No.: 14/777,572

(22) PCT Filed: Apr. 7, 2014

(86) PCT No.: PCT/JP2014/060077
§ 371 (c)(1),
(2) Date: Sep. 16, 2015

(87) PCT Pub. No.: WO2014/175050
PCT Pub. Date: Oct. 30, 2014

(65) Prior Publication Data
US 2016/0276642 A1    Sep. 22, 2016

(30) Foreign Application Priority Data
Apr. 22, 2013   (JP) ................................ 2013-089681

(51) Int. Cl.
*H01M 2/16* (2006.01)
*H01M 2/18* (2006.01)
(Continued)

(52) U.S. Cl.
CPC .......... *H01M 2/1686* (2013.01); *B32B 27/00* (2013.01); *B32B 37/08* (2013.01); *B32B 37/153* (2013.01);
(Continued)

(58) Field of Classification Search
None
See application file for complete search history.

(56) References Cited

U.S. PATENT DOCUMENTS

2010/0129720 A1* 5/2010 Sako .................. H01M 2/1653
                                                                  429/246
2012/0295165 A1* 11/2012 Morin .................... D21H 13/10
                                                                  429/247

FOREIGN PATENT DOCUMENTS

JP    56-069120 A    6/1981
JP    60-131221 A    7/1985
(Continued)

*Primary Examiner* — Jonathan G Leong
*Assistant Examiner* — Christopher P Domone
(74) *Attorney, Agent, or Firm* — DLA Piper LLP (US)

(57) ABSTRACT

A laminated porous membrane includes a polyolefin porous membrane, on one surface of which projections that are made of a polyolefin and satisfy 5 μm≤W≤50 μm (W: projection size) and 0.5 μm≤H (H: projection height) are irregularly scattered at a density of 3/cm² to 200/cm², and a modifying porous layer laminated on the surface of the polyolefin porous membrane having the projections, wherein the modifying porous layer includes a binder with a tensile strength of at least 5 N/mm² and inorganic particles.

6 Claims, 2 Drawing Sheets

(51) Int. Cl.

| | |
|---|---|
| *H01M 2/14* | (2006.01) |
| *B32B 27/00* | (2006.01) |
| *B32B 37/08* | (2006.01) |
| *B32B 37/15* | (2006.01) |
| *H01G 9/02* | (2006.01) |
| *H01G 11/52* | (2013.01) |
| *B32B 27/32* | (2006.01) |
| *B32B 7/12* | (2006.01) |
| *B32B 15/08* | (2006.01) |
| *B32B 15/20* | (2006.01) |
| *B32B 27/08* | (2006.01) |
| *B32B 27/20* | (2006.01) |
| *B32B 3/26* | (2006.01) |
| *B32B 3/30* | (2006.01) |
| *B32B 37/00* | (2006.01) |
| *B32B 38/00* | (2006.01) |

(52) U.S. Cl.
CPC ......... *H01M 2/145* (2013.01); *H01M 2/1653* (2013.01); *H01M 2/18* (2013.01); *B32B 3/26* (2013.01); *B32B 3/30* (2013.01); *B32B 7/12* (2013.01); *B32B 15/08* (2013.01); *B32B 15/20* (2013.01); *B32B 27/08* (2013.01); *B32B 27/205* (2013.01); *B32B 27/32* (2013.01); *B32B 27/327* (2013.01); *B32B 37/0038* (2013.01); *B32B 2038/0028* (2013.01); *B32B 2255/10* (2013.01); *B32B 2255/26* (2013.01); *B32B 2264/10* (2013.01); *B32B 2307/206* (2013.01); *B32B 2307/51* (2013.01); *B32B 2307/518* (2013.01); *B32B 2307/54* (2013.01); *B32B 2307/542* (2013.01); *B32B 2307/584* (2013.01); *B32B 2307/7242* (2013.01); *B32B 2457/10* (2013.01); *H01G 9/02* (2013.01); *H01G 11/52* (2013.01)

(56) References Cited

FOREIGN PATENT DOCUMENTS

| | | |
|---|---|---|
| JP | 3-65776 B2 | 10/1991 |
| JP | 07-329143 A | 12/1995 |
| JP | 3347854 B2 | 11/2002 |
| JP | 2003-103626 A | 4/2003 |
| JP | 2003-105122 A | 4/2003 |
| JP | 2007-063547 A | 3/2007 |
| JP | 2008-186721 A | 8/2008 |
| JP | 4460028 B2 | 5/2010 |
| JP | 2011-000832 A | 1/2011 |
| JP | 2012-043762 A | 3/2012 |
| JP | 4931083 B2 | 5/2012 |
| WO | 2010/104127 A1 | 9/2010 |

\* cited by examiner

LAMINATED POROUS MEMBRANE, PROCESS FOR MANUFACTURING SAME AND SEPARATOR FOR BATTERY

TECHNICAL FIELD

The present invention relates to a laminated porous membrane comprising a modifying porous layer and a polyolefin porous membrane suitable for lamination of the modifying porous layer, a method of producing the same, and a battery separator. The laminated porous membrane of the present invention can be used as a battery separator useful as a lithium ion battery separator.

BACKGROUND ART

Thermoplastic resin microporous membranes have been widely used, for example, as a material for separation, selective permeation, and isolation of substances: e.g., battery separators used in lithium ion secondary batteries, nickel-hydrogen batteries, nickel-cadmium batteries, and polymer batteries; separators for electric double layer capacitors; various filters such as reverse osmosis filtration membranes, ultrafiltration membranes, and microfiltration membranes; moisture-permeable waterproof clothing; and medical materials. In particular, as lithium ion secondary battery separators, polyethylene porous membranes have been suitably used which have ion permeability due to electrolyte impregnation, are excellent in electrical insulation property, electrolyte resistance, and oxidation resistance, and have a pore-blocking effect of blocking a current at a temperature of about 120 to 150° C. in abnormal temperature rise of a battery to suppress excessive temperature rise. However, when the temperature continues to rise for some reason even after pores are blocked, the polyethylene porous membrane may be ruptured because of a decrease in viscosity of polyethylene constituting the membrane and shrinkage of the membrane. This phenomenon is not a phenomenon that occurs only when polyethylene is used, and also when any other thermoplastic resin is used, this phenomenon is unavoidable at or higher than the melting point of the resin constituting the porous membrane.

In particular, lithium ion battery separators are highly responsible for battery properties, battery productivity, and battery safety, and required to have excellent mechanical properties, heat resistance, permeability, dimensional stability, pore-blocking property (shutdown property), melt-rupture property (meltdown property), and the like. Furthermore, improved adhesion to electrode material for improved battery cycle characteristics, and improved electrolyte permeability for improved productivity are required. For these reasons, studies have hitherto been conducted to laminate various modifying porous layers to a porous membrane. As the modifying porous layer, for example, polyamide-imide resins, polyimide resins, and polyamide resins, all of which have both heat resistance and electrolyte permeability, and/or fluorine resins, which have excellent electrode adhesion, are being suitably used. In addition, water-soluble or water-dispersible binders, which allow lamination of the modifying porous layer through relatively simple water washing and drying, are also being widely used. The modifying porous layer as used herein refers to a layer containing a resin that provides or improves at least one function such as heat resistance, adhesion to electrode material, or electrolyte permeability.

Furthermore, it is necessary to increase the area that can be loaded into a container in order to increase the battery capacity, and it is expected that separators as well as electrode sheets will become thinner and thinner. As a porous membrane becomes thinner, however, the porous membrane tends to be deformed in the planar direction; consequently, a battery separator in which a modifying porous layer is laminated to the thin porous membrane can undergo peeling-off of the modifying porous layer during processing, slitting, or battery assembling, and it becomes more difficult to secure the safety.

Furthermore, it is expected that the speed of battery assembling will be faster to achieve a cost reduction, and high adhesion between the porous membrane and the modifying porous layer to withstand high-speed processing are required, by which troubles such as peeling-off of the modifying porous layer are less likely to occur even in such high-speed processing. However, when a resin contained in the modifying porous layer is sufficiently infiltrated into a polyolefin porous membrane serving as a substrate in order to improve the adhesion, the amount of increase in air resistance disadvantageously increases.

PRIOR ART DOCUMENTS

Patent Documents

Patent Document 1 discloses a composite porous membrane comprising a polyethylene porous membrane with a thickness of 9 µm and polyvinylidene fluoride applied thereto, wherein some of the polyvinylidene fluoride moderately intrude into pores of the polyethylene porous membrane to exert an anchoring effect, whereby the peeling strength (T-peeling strength) at the interface between the polyethylene porous membrane and the coating layer of the polyvinylidene fluoride is 1.0 to 5.3 N/25 mm.

Patent Document 2 discloses a separator comprising a corona-discharged polyethylene porous membrane with a thickness of 16 µm, and a heat-resistant porous layer provided thereon comprising a self-crosslinkable acrylic resin and plate-like boehmite, wherein the peeling strength (T-peeling strength) at 180° between the polyethylene porous membrane and the heat-resistant porous layer is 1.1 to 3.0 N/10 mm.

Example 1 of Patent Document 3 discloses a multilayer porous membrane obtained as described below. A polyethylene resin solution containing 50 parts by mass of a composition, which is made of 47.5 parts by mass of polyethylene with a viscosity average molecular weight of 200,000, 2.5 parts by mass of polypropylene with a viscosity average molecular weight of 400,000, and an antioxidant, and 50 parts by mass of liquid paraffin is extruded at 200° C. from an extruder and taken up with a chill roll controlled at 25° C. to form a gel-like molding. The gel-like molding is then biaxially stretched to 7×6.4 times to give a polyolefin resin porous membrane. Thereafter, on the surface of the polyolefin resin porous membrane, a coating layer comprising polyvinyl alcohol and alumina particles is laminated.

Example 6 of Patent Document 4 discloses a nonaqueous secondary battery separator obtained as described below. A polyethylene resin solution, which contains 30% by weight of a composition of a polyethylene with a weight average molecular weight of 4,150,000 and a polyethylene with a weight average molecular weight of 560,000 at a weight ratio of 1:9 and 70% by weight a mixed solvent of liquid paraffin and decalin, is extruded at 148° C. from an extruder and cooled in a water bath to form a gel-like molding. The gel-like molding is then biaxially stretched to 5.5×11.0 times to give a polyethylene porous membrane. Thereafter, on the surface of the polyethylene porous membrane, a coating layer comprising meta-type wholly aromatic polyamide and alumina particles is laminated.

Example 1 of Patent Document 5 discloses a multilayer porous membrane obtained as described below. Forty-seven parts by mass of a polyethylene homopolymer with an Mv (viscosity average molecular weight) of 700,000, 46 parts by mass of a polyethylene homopolymer with an Mv of 250,000, and 7 parts by mass of a polypropylene homopolymer with an Mv of 400,000 are dry blended using a tumbler-type blender. To 99% by mass of a pure polymer mixture obtained, 1% by mass of pentaerythrityl-tetrakis-[3-(3,5-di-t-butyl-4-hydroxyphenyl)propionate] is added as an antioxidant, and dry blended again using the tumbler-type blender to give a polyethylene composition. The polyethylene composition is melt blended, and extruded and cast onto a chill roll whose surface temperature is controlled at 25° C. to give a sheet-like polyolefin composition with a thickness of 2,000 µm. The sheet-like polyolefin composition is then biaxially stretched to 7×7 times to give a polyethylene porous membrane, to which a water dispersion of calcined kaolin and latex is applied.

Patent Document 1: JP 2012-043762 A
Patent Document 2: Re-publication of PCT International Publication No. 2010-104127
Patent Document 3: Japanese Patent No. 4931083
Patent Document 4: Japanese Patent No. 4460028
Patent Document 5: JP 2011-000832 A

SUMMARY OF THE INVENTION

Problems to be Solved by the Invention

However, if such techniques of the prior art are used to meet the demand for faster processing and thinner separators associated with the cost reduction and increase in capacity which are expected to rapidly progress in the future, the modifying porous layer will be locally peeled off during slitting or battery assembling, and thus it will probably become more difficult to secure the safety. In particular, when the polyolefin resin porous membrane serving as a substrate is thin, it is less likely that a sufficient anchoring effect between the polyolefin resin porous membrane and the modifying porous layer is produced, and thus it becomes more difficult to secure the safety.

The present inventors, on the assumption that battery separators become thinner and thinner and their cost is further reduced in the future, aim to provide a laminated porous membrane comprising a modifying porous layer and a polyolefin porous membrane that has an extremely high peeling strength against the modifying porous layer, is suitable for high-speed processing in slitting and battery assembling, and suitable for lamination of the modifying porous layer, and the laminated porous membrane used as a battery separator.

Figure 1:
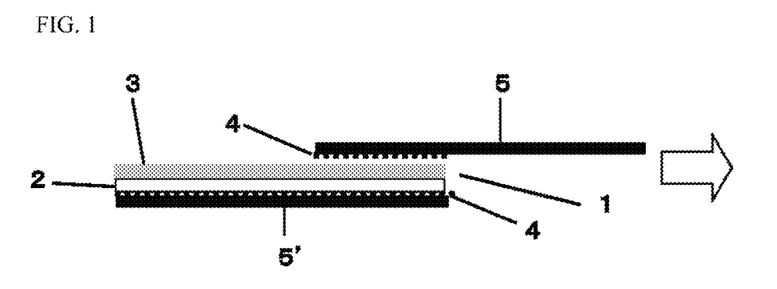
FIG. 1 is a schematic view illustrating the method for measuring a 0° peeling strength.

As used herein, the peeling strength between a polyolefin porous membrane and a modifying porous layer in a separator is a value measured by the following method (hereinafter also referred to as 0° peeling strength). FIG. 1 schematically shows a side view of a laminated sample of a polyolefin porous membrane and a modifying porous layer being pulled by a tensile tester (not shown). The number 1 represents a laminated sample; 2 represents a polyolefin porous membrane; 3 represents a modifying porous layer; 4 represents double-sided adhesive tape; 5 and 5' each represent an aluminum plate; and the arrow in the figure represents a tensile direction. To an aluminum plate (5) having a size of 50 mm×25 mm and a thickness of 0.5 mm, a double-sided adhesive tape (4) having the same size is applied, and a sample (1) (laminated porous membrane) cut out to 50 mm wide and 100 mm long is attached thereto with the side of a polyolefin porous membrane (2) facing the tape such that they are overlapped by 40 mm from one 25-meter-long side of the aluminum plate (5). The excess is cut away. Thereafter, double-sided adhesive tape is applied to one surface of an aluminum plate (5') 100 mm in length, 15 mm in width, and 0.5 mm in thickness, and attached to the aluminum plate (5) such that they are overlapped by 20 mm from the 25-meter-long side at the sample side. Thereafter, using a tensile tester, the aluminum plate (5) and the aluminum plate (5') are each pulled in parallel in the opposite direction at a tensile speed of 10 mm/min, and the strength is measured when the modifying porous layer is peeled off. When the peeling strength measured by this evaluation method is 130 N/15 mm or more, a phenomenon where the laminated modifying porous layer is peeled off during conveyance or processing hardly occurs even in the case where the thickness of the polyolefin porous membrane is, for example, 10 µm or less.

T-peeling strength or peeling strength at 180°, which has conventionally been used as a method for measuring a peeling strength, is a peel force measured when a coating layer is torn off a polyethylene porous membrane perpendicularly to the polyethylene porous membrane surface or obliquely backward from the perpendicular position. According to the evaluation method of the present invention, as compared to these conventional evaluation methods, scuff resistance during slitting or battery assembling can be more practically evaluated.

Means for Solving the Problems

To solve the problems described above, the laminated porous membrane of the present invention has the following structure:

A laminated porous membrane, comprising:
a polyolefin porous membrane, on one surface of which projections that are made of a polyolefin and satisfy 5 µm≤W≤50 µm (W: projection size) and 0.5 µm≤H (H: projection height) are irregularly scattered at a density of 3/cm$^2$ to 200/cm$^2$, and;
a modifying porous layer laminated on the surface of the polyolefin porous membrane having the projections, wherein the modifying porous layer comprises a binder with a tensile strength of at least 5 N/mm$^2$ and inorganic particles.

In the laminated porous membrane of the present invention, the resin is preferably polyvinyl alcohol or an acrylic resin.

In the laminated porous membrane of the present invention, the inorganic particles preferably comprise at least one selected from the group consisting of calcium carbonate, alumina, titania, barium sulfate, and boehmite.

To solve the problems described above, the battery separator of the present invention has the following structure:
A battery separator comprising the laminated porous membrane described above.

To solve the problems described above, the method of producing the laminated porous membrane of the present invention has the following structure:

A method of producing the laminated porous membrane described above, comprising the steps of:
(a) adding a molding solvent to a polyethylene resin, and then performing melt blending to prepare a polyethylene resin solution;

(b) extruding the polyethylene resin solution through a die, and cooling the extruded polyethylene resin solution with a chill roll having a surface from which the molding solvent has been removed to form a gel-like molding;

(c) stretching the gel-like molding in the machine direction and the transverse direction to provide a stretched molding;

(d) extracting the molding solvent away from the stretched molding, followed by drying to provide a porous molding;

(e) heat-treating the porous molding to provide a polyolefin porous membrane; and (f) forming a laminated membrane on a surface that has been in contact with the chill roll using a coating liquid comprising a binder with a tensile strength of at least 5 N/mm$^2$, inorganic particles, and a solvent that is capable of dissolving or dispersing the binder, followed by drying.

In the method of producing the laminated porous membrane of the present invention, the means for removing the molding solvent in the step (b) is preferably a doctor blade.

Effects of the Invention

The present invention provides a laminated porous membrane comprising a modifying porous layer and a polyolefin porous membrane having an extremely excellent adhesion to the modifying porous layer, and a battery separator including the laminated porous membrane, which separator undergoes no delamination even when conveyed at a high speed.

MODE FOR CARRYING OUT THE INVENTION

The polyolefin porous membrane for use in the present invention is a polyolefin porous membrane having on its surface an appropriate number of projections of appropriate shape, which polyolefin porous membrane is obtained by preparing a specific polyolefin resin solution, and highly controlling the cooling rate of the polyolefin resin solution extruded from an extruder through a die, and furthermore, when a modifying porous layer comprising inorganic particles and a binder with a tensile strength of at least 5 N/mm$^2$ is laminated on the polyolefin porous membrane, an extremely high peeling strength can be provided between the polyolefin porous membrane and the modifying porous layer.

The projection as used herein is essentially different from projections formed by adding, for example, inorganic particles to a polyolefin porous membrane. The projections formed by adding inorganic particles to a polyolefin porous membrane typically have an extremely small height, and to form projections with a height of 0.5 μm or more by this method, it is necessary to add particles having a particle size equal to or larger than the thickness of the polyolefin porous membrane. The addition of such particles, however, is not realistic because it reduces the strength of the polyolefin porous membrane.

The projection as used herein is a part of a polyolefin porous membrane that has been grown into a protrusion of appropriate shape, and does not reduce the essential properties of the polyolefin porous membrane.

The irregularly scattered projections as used herein are distinctly different from an arrangement having regularity or periodicity formed through passage through embossing rolls before or after stretching in producing a polyolefin porous membrane. Press working such as embossing, which basically form projections by compressing parts other than the projections, are not preferred because they tend to cause reductions in air resistance and electrolyte permeability.

The projection of appropriate shape as used herein means a projection having a size of 5 μm to 50 μm and a height of 0.5 μm or more, that is, satisfying 5 μm≤W≤50 μm (W: projection size) and 0.5 μm≤H (H: projection height). Such a projection, when a modifying porous layer is laminated on a porous membrane, acts as an anchor, and as a result, a laminated porous membrane having a high 0° peeling strength is provided. The upper limit of the height is not limited to a particular value, and 3.0 μm can be sufficient. As the number of projections having a sufficient height increases, the 0° peeling strength tends to increase. In other words, the 0° peeling strength is influenced by the number and the average height of projections having a height of 0.5 μm or more. The lower limit of the number of the projections is 3/cm$^2$, preferably 5/cm$^2$, and more preferably 10/cm$^2$. The upper limit of the number of the projections is 200/cm$^2$, preferably 150/cm$^2$. The lower limit of the height of the projection is 0.5 μm, preferably 0.8 μm, and more preferably 1.0 μm.

The size and the height of a projection in the present invention are values determined by the measurement methods described below.

The amount of increase in air resistance as used herein means a difference in air resistance between a polyolefin porous membrane serving as a substrate and a laminated porous membrane obtained by laminating a modifying porous layer, and is preferably 100 sec/100 cc Air or less.

The summary of a laminated porous membrane comprising the polyolefin porous membrane and the modifying porous layer of the present invention and the laminated porous membrane used as a battery separator will be described, but needless to say, the present invention is not limited to this representative example.

First, the polyolefin porous membrane of the present invention will be described.

The thickness of the polyolefin porous membrane of the present invention is preferably 25 μm or less, and the upper limit is preferably 20 μm, more preferably 16 μm. The lower limit is 7 μm, preferably 9 μm. When the thickness of the polyolefin porous membrane is in this preferred range, a membrane strength and a pore-blocking function of practical use can be provided, and the area per unit volume of a battery case will not be restricted, which is suitable for the increase in battery capacity which is expected to progress in the future.

The upper limit of the air resistance of the polyolefin porous membrane is preferably 300 sec/100 cc Air, more preferably 200 sec/100 cc Air, and still more preferably 150 sec/100 cc Air. The lower limit is preferably 50 sec/100 cc Air, more preferably 70 sec/100 cc Air, and still more preferably 100 sec/100 cc Air.

For the porosity of the polyolefin porous membrane, the upper limit is preferably 70%, more preferably 60%, and still more preferably 55%. The lower limit is preferably 30%, more preferably 35%, and still more preferably 40%. When the air resistance and the porosity are in these preferred ranges, functions of a battery can be fully exerted since the battery is provided with sufficient charge and discharge properties, in particular, sufficient ion permeability (charge and discharge operating voltage) and lifetime (closely related to the amount of electrolyte solution retained), and a sufficient mechanical strength and insulation property are provided, which reduces the risk of a short circuit during charge and discharge.

The average pore size of the polyolefin porous membrane, which has a great influence on pore-blocking performance, is preferably 0.01 to 1.0 μm, more preferably 0.05 to 0.5 μm, and still more preferably 0.1 to 0.3 μm. When the average pore size of the polyolefin porous membrane is in this preferred range, the modifying porous layer is provided with a sufficient 0° peeling strength by the anchoring effect of a functional resin, and the air resistance will not significantly decrease when the modifying porous layer is laminated; in addition, the response to temperature in a pore-blocking phenomenon will not slow down, and a pore-blocking temperature that depends on the temperature rise rate will not shift to higher temperatures.

The polyolefin resin that constitutes the polyolefin porous membrane is preferably polyethylene or polypropylene. The polyolefin resin may be a single substance, a mixture of two or more different polyolefin resins, for example, a mixture of polyethylene and polypropylene, or a copolymer of different olefins. This is because they have a pore-blocking effect of blocking a current in abnormal temperature rise of a battery to suppress excessive temperature rise, in addition to basic properties such as electrical insulating property and ion permeability.

In particular, polyethylene is preferred from the viewpoint of excellent pore-blocking performance. Taking polyethylene as an example, the polyolefin resin for use in the present invention will now be described in detail.

Examples of polyethylenes include ultra high molecular weight polyethylene, high density polyethylene, medium density polyethylene, and low density polyethylene. Any polymerization catalyst may be used, and examples include Ziegler-Natta catalysts, Phillips catalysts, and metallocene catalysts. These polyethylenes may be not only a homopolymer of ethylene but also a copolymer containing a small amount of any other α-olefin. Examples of preferred α-olefins other than ethylene include propylene, 1-butene, 1-pentene, 1-hexene, 4-methyl-1-pentene, 1-octene, (meth)acrylic acid, esters of (meth)acrylic acid, and styrene.

The polyethylene may be a single substance, but is preferably a mixture of two or more polyethylenes. As the polyethylene mixture, a mixture of two or more ultra high molecular weight polyethylenes having a different weight average molecular weight (Mw), or a mixture of high density polyethylenes, medium density polyethylenes, and low density polyethylenes, each having a different Mw, may be used, or a mixture of two or more polyethylenes selected from the group consisting of ultra high molecular weight polyethylene, high density polyethylene, medium density polyethylene, and low density polyethylene may be used.

In particular, the polyethylene mixture is preferably a mixture of an ultra high molecular weight polyethylene with a Mw of $5\times10^5$ or more and a polyethylene with a Mw of $1\times10^4$ or more but less than $5\times10^5$. The Mw of the ultra high molecular weight polyethylene is preferably $5\times10^5$ to $1\times10^7$, more preferably $1\times10^6$ to $15\times10^6$, and particularly preferably $1\times10^6$ to $5\times10^6$. As the polyethylene with a Mw of $1\times10^4$ or more but less than $5\times10^5$, any of high density polyethylene, medium density polyethylene, and low density polyethylene can be used, and in particular, it is preferable to use high density polyethylene. As the polyethylene with a Mw of $1\times10^4$ or more but less than $5\times10^5$, two or more polyethylenes having a different Mw may be used, or two or more polyethylenes having a different density may be used. When the upper limit of the Mw of the polyethylene mixture is not more than $15\times10^6$, melt extrusion can be easily carried out.

In the present invention, the upper limit of the amount of ultra high molecular weight polyethylene is preferably 40% by weight, more preferably 30% by weight, and still more preferably 10% by weight, and the lower limit is preferably 1% by weight, more preferably 2% by weight, and still more preferably 5% by weight.

When the amount of ultra high molecular weight polyethylene is in the preferred range, projections having a sufficient height are formed. The projections, when a modifying porous layer is laminated, act as an anchor, providing extremely high peeling resistance to the force exerted parallel to the plane of a polyethylene porous membrane. Furthermore, a sufficient tensile strength is provided even when the thickness of the polyethylene porous membrane is reduced. The tensile strength is preferably 100 MPa or more. The upper limit is not specifically defined.

Figure 2:
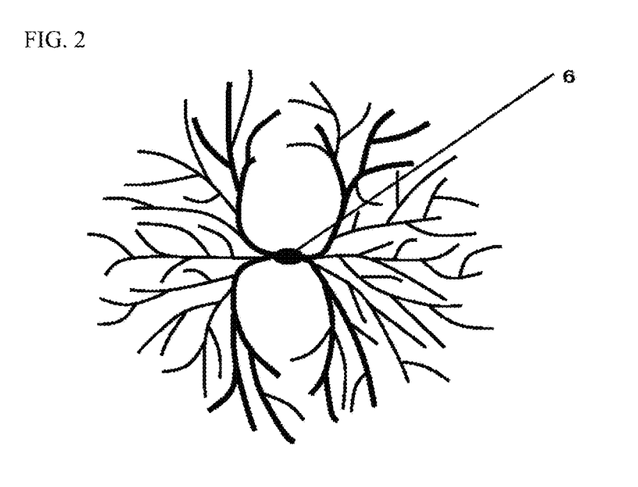
FIG. 2 is a schematic view illustrating a spherulite structure and a crystalline nucleus of polyethylene in a polyethylene porous membrane.
Figure 3:
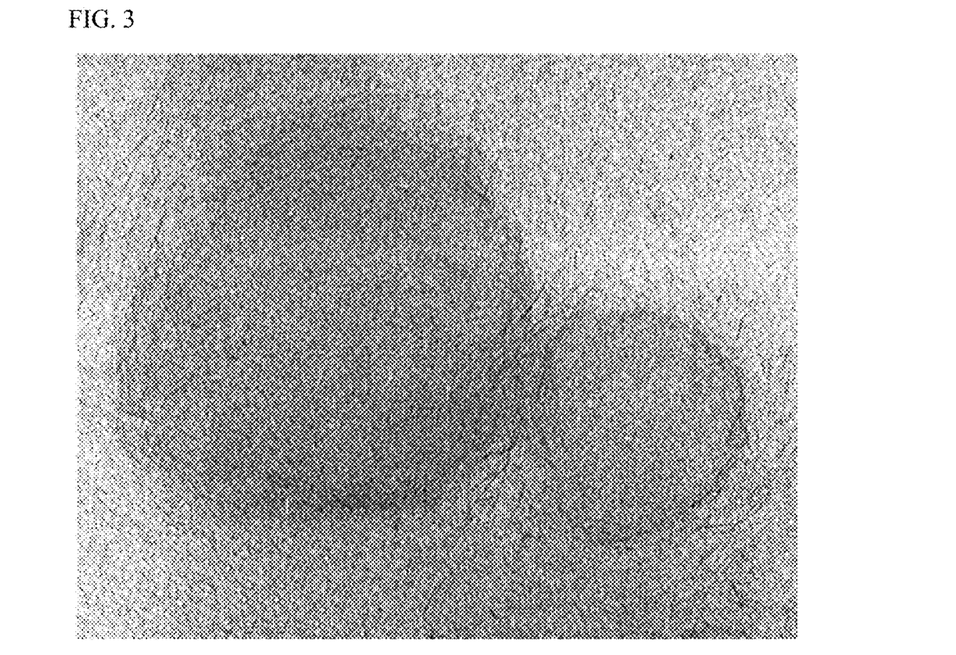
FIG. 3 is a micrograph of a ring-like mark derived from a spherulite of polyethylene in a polyethylene porous membrane.

The present inventors consider the mechanism by which the projections of the present invention are formed as described below. The moment when a resin solution containing a molten polyethylene resin and a molding solvent is extruded through a die, crystallization of polyethylene starts, and the speed of crystallization increases when the resin solution is quenched by contact with a chill roll. At this time, a spherulite of symmetric structure having a crystalline nucleus is formed (FIG. 2). When the speed of heat transfer between the chill roll surface and the molten polyethylene resin is relatively low, the speed of crystallization is low, resulting in a spherulite having a relatively small crystalline nucleus. When the speed of heat transfer is high, a spherulite having a relatively large crystalline nucleus is formed. The crystalline nucleus of such a spherulite becomes a projection in a downstream process: TD (transverse direction) and/or MD (machine direction) stretching. The spherulite appears as a ring-like mark on the polyethylene porous membrane surface (FIG. 3).

The ratio of the weight average molecular weight (Mw) to the number average molecular weight (Mn), i.e., the molecular weight distribution (Mw/Mn) of the polyethylene resin is preferably in the range of 5 to 200, more preferably 10 to 100. When Mw/Mn is in this preferred range, it is easy to extrude a polyethylene resin solution, and a sufficient number of projections is formed; furthermore, a sufficient mechanical strength is provided when the thickness of the polyethylene porous membrane is reduced. Mw/Mn is used as an index of molecular weight distribution; namely, in the case of a polyethylene composed of a single substance, larger values mean wider molecular weight distributions. The Mw/Mn of the polyethylene composed of a single substance can be adjusted as appropriate by means of multistage polymerization of the polyethylene. The Mw/Mn of a mixture of polyethylenes can be adjusted as appropriate by adjusting the molecular weight and mixing ratio of the components.

For the polyethylene porous membrane, a production method suitable for the intended use can be freely selected provided that the various characteristics described above are satisfied. Examples of the method of producing the porous membrane include the foaming process, the phase separation method, the dissolution and recrystallization method, the stretching pore-forming process, and the powder sintering process, among which the phase separation method is preferred in terms of uniform micropores and cost.

Examples of the production method using the phase separation method include a method including melt blending, for example, polyethylene with a molding solvent by heating, extruding the resulting molten mixture through a die, cooling the extrudate to form a gel-like molding, stretching the gel-like molding obtained in at least one direction, and removing the molding solvent to provide a porous membrane.

The polyethylene porous membrane may be a monolayer membrane or may be composed of two or more layers different in molecular weight or average pore size.

The multilayer membrane comprising two or more layers can be produced either by a method including melt blending each of the polyethylenes constituting, for example, a layer (x) and a layer (y) with a molding solvent, feeding the resulting molten mixtures from different extruders to one die to integrate gel sheets constituting each component, and co-extruding the integrated gel sheet, or by a method including laminating gel sheets constituting each layer and heat-fusing the laminate. The co-extrusion method is preferred because a high interlayer adhesive strength is easily achieved; high permeability is easily maintained because continuous pores are easily formed between layers; and productivity is high.

When the membrane is composed of two or more layers, it is preferred that the molecular weight and the molecular weight distribution of the polyethylene resin of at least one outermost layer satisfy the above conditions.

The polyethylene porous membrane needs to have a function of blocking pores in the case of abnormal charge and discharge reaction. Accordingly, the melting point (softening point) of the constituent resin is preferably 70 to 150° C., more preferably 80 to 140° C., and still more preferably 100 to 130° C. When the melting point of the constituting resin is in this preferred range, the pore-blocking function will not be activated in normal use, and therefore, a battery will not be inoperable, while the pore-blocking function is activated in an abnormal reaction, whereby the safety can be secured.

The method of producing the polyolefin porous membrane for use in the present invention will be described.

The method of producing the polyolefin porous membrane for use in the present invention includes the following steps (a) to (e):

(a) adding a molding solvent to a polyolefin resin, and then performing melt blending to prepare a polyolefin resin solution;

(b) extruding the polyolefin resin solution through a die, and cooling the extruded polyethylene resin solution with a chill roll having a surface from which the molding solvent has been removed by means for removing molding solvent to form a gel-like molding;

(c) stretching the gel-like molding in MD (machine direction) and TD (transverse direction) to provide a stretched molding;

(d) extracting the molding solvent away from the stretched molding, followed by drying to provide a porous molding; and (e) heat-treating the porous molding to provide a polyolefin porous membrane.

Furthermore, following the steps (a) to (e), other steps such as corona treatment may be performed as required.

Each step will be described below taking the case where a polyethylene resin is used as a polyolefin resin.

(a) Adding Molding Solvent to Polyethylene Resin, and then Performing Melt Blending to Prepare Polyethylene Resin Solution The molding solvent may be any solvent that can sufficiently dissolve polyethylene. Examples include aliphatic or cyclic hydrocarbons such as nonane, decane, undecane, dodecane, and liquid paraffin; and mineral oil distillates having a boiling point equivalent to those of these hydrocarbons, and to provide a gel-like molding having a stable solvent content, nonvolatile solvents such as liquid paraffin are preferred. Thermal dissolution is carried out by stirring or uniform mixing in an extruder at a temperature at which a polyethylene composition completely dissolves. When the dissolution is carried out in an extruder or with stirring in a solvent, the temperature, which depends on the polymer and solvent used, is preferably in the range of 140 to 250° C., for example.

The concentration of the polyethylene resin is preferably 25 to 40 parts by weight, more preferably 28 to 35 parts by weight, based on 100 parts by weight of the total amount of the polyethylene resin and the molding solvent. When the concentration of the polyethylene resin in this preferred range, sufficient numbers of crystalline nuclei for forming projections are formed, and sufficient numbers of projections are formed. In addition, when a polyethylene resin solution is extruded, swelling and neck-in at a die exit are prevented, and the moldability and self-supportability of an extrudate are maintained.

The melt blending may be carried out by any method, and typically, it is carried out by uniform blending in an extruder. This method is suitable for preparing a high-concentration polyethylene solution. The melting temperature is preferably in the range from the melting point of polyethylene+10° C. to the melting point of polyethylene+100° C. In general, the melting temperature is preferably in the range of 160 to 230° C., more preferably in the range of 170 to 200° C. The melting point as used herein refers to a value determined by differential scanning calorimetry (DSC) in accordance with JIS K 7121. The molding solvent, which may be added before the start of blending or may be introduced, during blending, into an extruder and further melt blended, is preferably added before the start of blending to bring into solution in advance. In the melt blending, it is preferable to add an antioxidant to prevent oxidation of polyethylene.

(b) Extruding Polyethylene Resin Solution through Die, and Cooling Extruded Polyethylene Resin Solution with Chill Roll Having Surface from which Molding Solvent has been Removed by Means for Removing Molding Solvent to Form Gel-Like Molding The melt blended polyethylene resin solution is extruded through a die directly from an extruder or via another extruder. As the die, a sheet-forming die of rectangular shape is typically used.

The polyethylene resin solution extruded through the die is brought into contact with a rotating chill roll whose surface temperature is controlled at 20° C. to 40° C. with a coolant to thereby form a gel-like molding. The extruded polyethylene resin solution is preferably cooled to 25° C. or lower. The important thing here is a cooling rate in a temperature range where crystallization substantially proceeds. For example, the polyethylene resin solution extruded at a cooling rate in a temperature range where crystallization substantially proceeds of 10° C./sec or more is cooled to provide a gel-like molding. The cooling rate is preferably 20° C./sec or more, more preferably 30° C./sec or more, and still more preferably 50° C./sec or more. Through such cooling, a structure is fixed in which a polyethylene phase is microphase-separated by solvent, and spherulites each having a relatively large nucleus are formed on the surface of the gel-like molding that has been in contact with the chill roll, whereby projections of appropriate shape can be formed after stretching. The cooling rate can be estimated by simulation using the extrusion temperature of the gel-like molding, the thermal conductivity of the gel-like molding, the thickness of the gel-like molding, the molding solvent, the chill roll, and the heat transfer rate of air.

Figure 4:
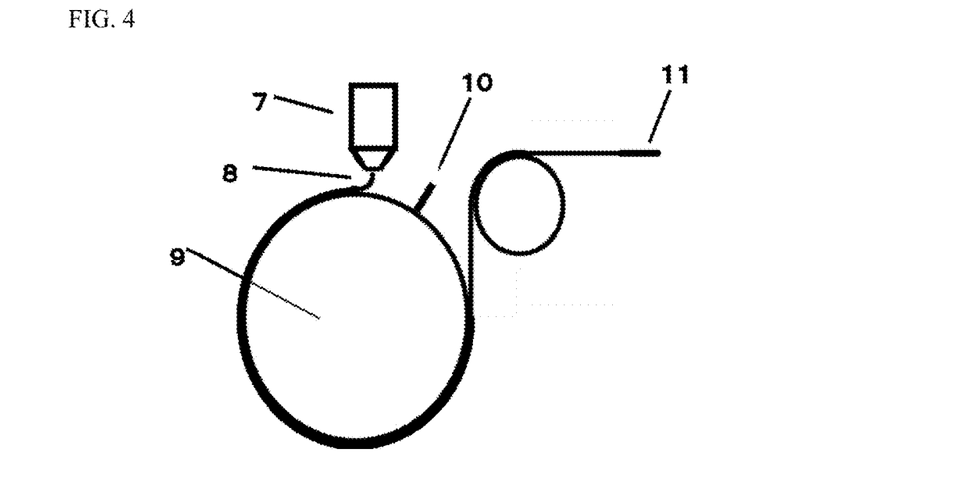
FIG. 4 is a schematic view illustrating the process in which a polyethylene resin solution is extruded through a die mounted at the tip of an extruder and cooled with a chill roll to form a gel-like molding.

In the present invention, it is important to remove the molding solvent as much as possible which is adhering to the part of the chill roll surface where the polyethylene resin solution extruded through the die is brought into contact. Specifically, as shown in FIG. 4, the polyethylene resin solution is cooled by winding around the rotating chill roll to provide a gel-like molding. To the chill roll surface after the gel-like molding has been pulled apart, the molding solvent is adhering, and the chill roll will usually be in contact with the polyethylene resin solution again as it is. Disadvantageously, the molding solvent adhering to the chill roll surface in large amounts slows down the cooling rate due to its heat-insulating effect, reducing the likelihood that projections are formed. Therefore, it is important to remove the molding solvent as much as possible before the chill roll is brought into contact with the polyethylene resin solution again.

The means for removing molding solvent, that is, the method for removing the molding solvent from the chill roll is not critical, but a method is preferably employed in which a doctor blade is put on the chill roll such that the blade is parallel to the width direction of the gel-like molding, and the molding solvent is scraped off to the extent that the molding solvent cannot be visually observed on the chill roll surface from immediately after passing through the doctor blade until coming into contact with the gel-like molding. Alternatively, the molding solvent can be removed by means such as blowing off with compressed air, suction, or a combination of these methods. In particular, scraping off using a doctor blade is preferred because it can be carried out with relative ease, and it is more preferable to use a plurality of doctor blades rather than one doctor blade to remove the molding solvent with improved efficiency.

The doctor blade may be made of any material that has resistance to the molding solvent, and is preferably made of resin or rubber rather than metal. This is because if the doctor blade is made of metal, the chill roll can be damaged. Examples of resins doctor blades include polyester doctor blades, polyacetal doctor blades, and polyethylene doctor blades.

Even if the temperature of the chill roll is set at lower than 20° C., not only a sufficient cooling rate cannot be achieved because of the heat-insulating effect of the molding solvent, but also the surface of the gel-like molding may be roughened by dew condensation caused on the chill roll. The thickness of the polyethylene resin solution in extrusion is preferably 1,500 µm or less, more preferably 1,000 µm or less, and still more preferably 800 µm or less. When the thickness of the polyethylene resin solution in extrusion is in this range, advantageously, the cooling rate of the surface facing the chill roll will not be slow.

(c) Stretching Gel-Like Molding in MD (Machine Direction) and TD (Transverse Direction) to Provide Stretched Molding The gel-like molding is then stretched to provide a stretched molding. The stretching is carried out in two directions, MD and TD, at a predetermined ratio by heating the gel-like molding using a conventional tenter method, roll method, or a combination of these methods. The stretching may be either MD and TD (machine direction and transverse direction) simultaneous stretching (simultaneous biaxial stretching) or sequential stretching. The sequential stretching in MD and TD may be carried out in any order, and at least one of MD and TD may be stretched in multiple stages. The stretching temperature is preferably not higher than the melting point of the polyolefin composition+10° C. The stretching ratio, which varies depending on the original thickness, is preferably 9 times or more, more preferably 16 to 400 times in area ratio. In the case of MD and TD simultaneous stretching (simultaneous biaxial stretching), the stretching at the same ratio in MD and TD, e.g., 3×3, 5×5, and 7×7 is preferred. When the area ratio is in this preferred range, the stretching is sufficient, and a porous membrane with high elasticity and high strength is provided. Furthermore, by adjusting the stretching temperature, the desired air resistance can be achieved.

(d) Extracting Molding Solvent Away from Stretched Molding, Followed by Drying to Provide Porous Molding The stretched molding after being stretched is then treated with a washing solvent to remove the residual molding solvent, thereby providing a porous membrane. Examples of the washing solvent that can be used include volatile solvents including hydrocarbons such as pentane, hexane, and heptane, chlorinated hydrocarbons such as methylene chloride and carbon tetrachloride, fluorohydrocarbons such as trifluoroethane, and ethers such as diethyl ether and dioxane. These washing solvents are appropriately selected according to the molding solvent used to dissolve polyethylene, and used alone or in combination. The washing can be carried out by, for example, extraction through immersion in the washing solvent, showering the washing solvent, sucking the washing solvent from the side opposite to the stretched molding, or a combination thereof. Such washing is carried out until the amount of the residual solvent in the stretched molding is reduced to less than 1% by weight. Thereafter, the washing solvent is dried; the drying of the washing solvent can be carried out, for example, by heat-drying or air-drying.

(e) Heat-Treating Porous Molding to Provide Polyethylene Porous Membrane

The porous molding obtained by drying is further heat-treated to provide a polyethylene porous membrane. The heat treatment temperature is preferably 90 to 150° C. When the heat treatment temperature is in this preferred range, the reduction in heat shrinkage rate and the air resistance of the polyolefin porous membrane obtained are sufficiently secured. The residence time in this heat-treating step, although not critical, is typically 1 sec to 10 min, preferably 3 sec to 2 min. For the heat treatment, any of the tenter system, roll system, rolling system, and free system can be employed.

Furthermore, in the heat-treating step, the porous molding is preferably shrunk in at least one of MD (machine direction) and TD (transverse direction) while being set in the two directions MD and TD. If the porous molding is not shrunk in at least one of MD of TD while being set in the two directions MD and TD, the reduction in heat shrinkage rate deteriorates. The shrinkage rate in at least one of MD and TD is preferably 0.01 to 50%, more preferably 3 to 20%.

When the shrinkage rate is in this preferred range, the heat shrinkage rate after 8 hr at 105° C. is improved, and the air resistance is maintained.

It should be noted that following the steps (a) to (e), other functionalizing steps such as corona treatment and hydrophilization may be performed as required.

The modifying porous layer for use in the present invention will now be described.

In a preferred aspect, the modifying porous layer is laminated on the surface of the polyolefin porous membrane having projections. When the modifying porous layer is provided on both surfaces of the polyolefin porous membrane, it is preferred, for exerting the effects of the present invention, that the modifying porous layer on the side to which a stronger parallel stress is applied by contact with rolls, bars, and the like in downstream processes such as slitting and conveyance be laminated on the surface of the polyethylene porous membrane having projections.

The modifying porous layer in the present invention provides or improves at least one function such as heat resistance, adhesion to electrode material, and electrolyte permeability. The modifying porous layer comprises inorganic particles and a binder with a tensile strength of at least 5 N/mm$^2$. Using the binder with a tensile strength of at least 5 N/mm$^2$ produces a combined effect of the projections on the surface of the polyolefin porous membrane and the tensile strength of the binder, providing a laminated porous membrane with an extremely high 0° peeling strength. Furthermore, as compared to the case of the polyolefin porous membrane alone, the air resistance of the laminated porous membrane is not significantly high despite the lamination of the modifying porous layer. This is because a sufficient 0° peeling strength can be provided even if a large amount of binder is not filtrated into pores of the polyolefin porous membrane.

The lower limit of the tensile strength of the binder is preferably 10 N/mm$^2$, more preferably 20 N/mm$^2$, and still more preferably 30 N/mm$^2$. Although the upper limit is not specifically defined, 100 N/mm$^2$ can be sufficient. The tensile strength of the binder refers to a value determined by the method described below.

The binder with a tensile strength of at least 5 N/mm$^2$ for use in the present invention may be any binder with a tensile strength of at least 5 N/mm$^2$, and examples include polyvinyl alcohol, cellulose ether resins, and acrylic resins. Examples of cellulose ether resins include carboxymethylcellulose (CMC), hydroxyethylcellulose (HEC), carboxyethylcellulose, methylcellulose, ethylcellulose, cyanoethylcellulose, and oxyethylcellulose, and preferred acrylic resins are cross-linked acrylic resins. Commercially available aqueous solutions or water dispersions can also be used. Examples of the commercially available products include "POVACOAT" (registered trademark) available from Nisshin Kasei Co., Ltd., "JURYMER" (registered trademark) AT-510, ET-410, FC-60, SEK-301 available from Toagosei Co., Ltd., UW-223SX, UW-550CS available from Taisei Fine Chemical Co., Ltd., and WE-301, EC-906EF, CG-8490 available from DIC Corporation. Of these, polyvinyl alcohol and acrylic resins, which have a high affinity for nonaqueous electrolyte solution, appropriate heat resistance, and relatively high tensile strength, are preferred.

To reduce curling of the polyolefin porous membrane due to the lamination of the modifying porous layer, it is important to add inorganic particles to a coating liquid for forming the modifying porous layer. The coating liquid in the present invention contains a binder with a tensile strength of at least 5 N/mm$^2$, inorganic particles, and a solvent that is capable of dissolving or dispersing the binder, and is used to form a modifying porous layer. The binder serves at least to bind inorganic particles to each other and to bind the polyolefin porous membrane to the modifying porous layer. Examples of solvents include water, alcohols, acetone, and n-methylpyrrolidone. The addition of inorganic particles to the coating liquid can produce effects such as prevention of internal short-circuiting due to the growth of dendrites on an electrode inside a battery (dendrite-preventing effect), reduction in heat shrinkage rate, and impartment of slip characteristics. The upper limit of the amount of the particles added is preferably 98% by weight, more preferably 95% by weight. The lower limit is preferably 80% by weight, more preferably 85% by weight. When the amount of the particles added is in this preferred range, the curling-reducing effect produced is sufficient; the percentage of the functional resin relative to the total volume of the modifying porous layer is optimal; and the modifying porous layer is provided with a sufficient 0° peeling strength.

The average diameter of the inorganic particles is preferably 1.5 times to 50 times the average pore size of the polyolefin porous membrane, more preferably 2.0 times to 20 times. When the average diameter of the particles is in this preferred range, the heat resistant resin and the particles in a mixed state block the pores of the polyolefin porous membrane, and as a result, the air resistance is maintained; furthermore, the particles fall off during battery assembling to prevent serious battery defects.

Examples of inorganic particles include calcium carbonate, calcium phosphate, amorphous silica, crystalline glass filler, kaolin, talc, titanium dioxide, alumina, silica-alumina composite oxide particles, barium sulfate, calcium fluoride, lithium fluoride, zeolite, molybdenum sulfide, mica, and boehmite Optionally, heat resistant cross-linked polymer particles may be added. Examples of heat resistant cross-linked polymer particles include cross-linked polystyrene particles, cross-linked acrylic resin particles, and cross-linked methyl methacrylate particles.

The shape of the inorganic particles may be spherical, substantially spherical, plate-like, needle-like, or polyhedral, but is not limited thereto.

The solid component concentration in the coating liquid is not critical as long as the coating liquid can be uniformly applied, and is preferably 50% by weight to 98% by weight, more preferably 80% by weight to 95% by weight. When the solid component concentration in the coating liquid is in this preferred range, the modifying porous layer is prevented from becoming brittle, and the modifying porous layer is provided with a sufficient 0° peeling strength.

The thickness of the modifying porous layer is preferably 1 to 5 μm, more preferably 1 to 4 μm, and still more preferably 1 to 3 μm. When the thickness of the modifying porous layer is in this preferred range, the laminated porous membrane obtained by laminating the modifying porous layer can have a high membrane strength and insulation property when it melts and shrinks at or higher than its melting point, and a sufficient pore-blocking function can be provided to prevent an abnormal reaction. Furthermore, the size when taken up can be decreased, which is suitable for the increase in battery capacity. Furthermore, reduced curling leads to higher productivity in battery assembling.

The porosity of the modifying porous layer is preferably 30 to 90%, more preferably 40 to 70%. The desired porosity can be achieved by appropriately adjusting the concentration of inorganic particles and the binder concentration. When the porosity of the modifying porous layer is in this preferred range, the laminated porous membrane obtained by laminating the modifying porous layer has low electrical resistance, which assists in flow of high current, and the membrane strength is maintained.

The upper limit of the total thickness of the laminated porous membrane obtained by laminating the modifying porous layer is preferably 25 µm, more preferably 20 µm. The lower limit is preferably not less than 6 µm, more preferably not less than 7 µm. When the total thickness of the laminated porous membrane is in this preferred range, the laminated porous membrane obtained by laminating the modifying porous layer can have a sufficiently high mechanical strength and insulation property. In addition, the area of electrodes that can be loaded into a container is reduced, whereby the decrease in capacity can be avoided.

The air resistance of the laminated porous membrane, which is one of the most important properties, is preferably 50 to 600 sec/100 cc Air, more preferably 100 to 500 sec/100 cc Air, and still more preferably 100 to 400 sec/100 cc Air. The desired air resistance can be achieved by adjusting the porosity of the modifying porous layer to adjust the degree of infiltration of the binder into the polyolefin porous membrane. When the air resistance of the laminated porous membrane is in this preferred range, a sufficient insulation property is provided, and clogging of foreign substances, short-circuiting, and membrane rupture are prevented. In addition, a reduced membrane resistance provides charge and discharge properties and lifetime properties in a practical range.

The method of laminating the modifying porous layer to the polyolefin porous membrane in the present invention will now be described.

The modifying porous layer can be laminated to the polyolefin porous membrane by any known method. Specifically, a method can be used in which the above-described coating liquid is applied to the polyolefin porous membrane to a predetermined thickness by the method described below, and dried under the conditions of a drying temperature of 40 to 80° C. and a drying time of 5 seconds to 60 seconds. A method can also be used in which a coating liquid obtained by dissolution in a solvent capable of dissolving a binder and miscible with water is laminated to a given polyolefin porous membrane using the coating method described below, and the laminate is placed in a specific humidity environment to phase-separate the solvent in which the binder and water are mixed, and further placed in a water bath (coagulation bath) to coagulate the binder.

Examples of the method for applying the coating liquid include reverse roll coating, gravure coating, kiss coating, roll brushing, spray coating, air knife coating, meyer bar coating, pipe doctor method, blade coating, and die coating, and these methods can be used alone or in combination.

The laminated porous membrane of the present invention desirably stored dry, but when it is difficult to store it absolutely dry, it is preferable to perform a vacuum drying treatment at 100° C. or lower immediately before use.

The laminated porous membrane of the present invention can be used as a separator for secondary batteries such as nickel-hydrogen batteries, nickel-cadmium batteries, nickel-zinc batteries, silver-zinc batteries, lithium secondary batteries, and lithium polymer secondary batteries, and plastic film capacitors, ceramic capacitors, and electric double layer capacitors, and is preferably used particularly as a separator for lithium ion secondary batteries. A description will be given below taking a lithium ion secondary battery as an example.

In a lithium ion secondary battery, a cathode and an anode are laminated with a separator interposed therebetween, and the separator contains an electrolytic solution (electrolyte). The structure of the electrodes is not critical and may be any known structure. For example, the structure can be an electrode structure in which a cathode and an anode in the form of a disk are arranged opposed to each other (coin-type), an electrode structure in which a cathode and an anode in the form of a flat plate are alternately laminated (laminated-type), an electrode structure in which a cathode and an anode in the form of a strip are laminated and wound (wound-type), and the like.

The cathode typically has a current collector and a cathode active material layer that is formed on the surface of the current collector and contains a cathode active material capable of occluding and releasing lithium ions. Examples of cathode active materials include inorganic compounds such as transition metal oxides, composite oxides of lithium and a transition metal (lithium composite oxides), and transition metal sulfides. Examples of transition metals include V, Mn, Fe, Co, and Ni. Preferred examples of lithium composite oxides among the cathode active materials include lithium nickel oxide, lithium cobalt oxide, lithium manganese oxide, and layered lithium composite oxides based on $\alpha$-NaFeO$_2$ structure.

The anode has a current collector and an anode active material layer that is formed on the surface of the current collector and contains an anode active material. Examples of anode active materials include carbonaceous materials such as natural graphite, artificial graphite, cokes, and carbon black. The electrolytic solution can be obtained by dissolving a lithium salt in an organic solvent. Examples of lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LNC_2F_5SO_2)_2$, $LiPF_4(CF_3)_2$, $LiPF_3(C_2F_5)_3$, lower aliphatic carboxylic acid lithium salts, and $LiAlCl_4$. These may be used alone or in combination of two or more thereof. Examples of organic solvents include high-boiling and high-dielectric organic solvents such as ethylene carbonate, propylene carbonate, ethyl methyl carbonate, and $\gamma$-butyrolactone; and low-boiling and low-viscosity organic solvents such as tetrahydrofuran, 2-methyltetrahydrofuran, dimethoxyethane, dioxolane, dimethyl carbonate, and diethyl carbonate. These may be used alone or in combination of two or more thereof. In particular, high-dielectric organic solvents have high viscosity, and low-viscosity organic solvents have a low dielectric constant; therefore, it is preferable to use the two in combination.

When a battery is assembled, the separator of the present invention can be provided with ion permeability by impregnating the separator with an electrolytic solution. In general, the impregnation treatment is performed by immersing a microporous membrane in an electrolytic solution at normal temperature. For example, in the case of assembling a cylindrical battery, a cathode sheet, a separator (composite porous membrane), and an anode sheet are first laminated in the order mentioned, and this laminate is taken up from one end to provide a wound-type electrode element. This electrode element is then inserted into a battery can and impregnated with the above electrolytic solution, and furthermore, a battery lid that is provided with a safety valve and serves also as a cathode terminal is caulked via a gasket to thereby obtain a battery.

EXAMPLES

The present invention will now be described in detail with reference to examples, but these examples are not intended to limit the present invention. It should be noted that the measured values in the examples are values determined by the following methods.

1. Tensile Strength of Binder (N/mm$^2$)

A binder was thoroughly dissolved or water-dispersed in a solvent that was used in Examples and Comparative Examples and capable of dissolving the binder. The resultant was placed in a dumbbell mold for preparing a NO. 2 test piece defined in JIS K 7113 such that the membrane thickness after being dried would be about 100 μm, air-dried at 25° C., and further vacuum-dried (degree of vacuum: 3 mmHg) at 25° C. for 8 hours to sufficiently remove the solvent. The sample sheet thus obtained was subjected to tensile strength measurement.

Using a tensile tester (Autograph AGS-J manufactured by Shimadzu Corporation, load cell capacity: 1 kN), the measurements were made under the following conditions. Sample films and measurement conditions were as described below, and the measurements were made three times. The average value was used as the tensile strength of the binder.

Chuck distance: 40 mm
Testing speed: 20 mm/min
Measurement environment: 20° C., 60% relative humidity 2. The Number of Projections The number of projections and their sizes were determined using a confocal microscope (HD100 available from Lasertec Corporation) mounted on a base-isolated stand in accordance with the following procedure after a light source was stabilized.

Procedure (1) For each of the polyethylene porous membranes obtained in Examples and Comparative Examples, a square outline of 1 cm×1 cm was drawn on the surface that had been in contact with a chill roll during film formation with an oil-based superfine pen.

(2) The polyethylene porous membrane was mounted on a sample stage with the surface on which the square outline was drawn facing upward, and closely fixed to the sample stage using a statically contacting apparatus included with the confocal microscope.

(3) Using a 5× objective lens, a ring-like mark derived from a spherulite of polyethylene as shown in FIG. 3 was displayed on a monitor as a two-dimensional image (called REAL screen in this apparatus), and the position of the sample stage was adjusted such that the darkest part in the ring-like mark was positioned substantially in the center of the monitor screen. In the case where two ring-like marks were linked together, their contact point was centered. The projection height measurement was performed on ring-like marks derived from a spherulite of polyethylene whose major axis was at least 0.2 mm. For the major axis of each ring-like mark, a cursor was placed across the major axis of the ring in the above two-dimensional image to read its length.

(4) The objective lens was replaced with a 20× lens. The central part of the monitor screen was focused (in this apparatus, the central part of the monitor screen was most brightly displayed), and the height at this position was used as a reference height (called REF SET in this apparatus).

(5) The measuring range in the height direction was set within 15 μm for above and below taking the above reference height as 0 μm. A three-dimensional data was acquired at a scanning time of 120 seconds and a STEP moving distance of 0.1 μm/Step.

(6) After the acquisition of the three-dimensional data, an image for data processing (called Z image in this apparatus) was displayed and subjected to smoothing treatment (smoothing conditions, filter size: 3×3, matrix type: SMOOTH3-0, number of treatments: once). Horizontal correction was performed as required on a horizontal correction screen.

(7) In the image for data processing, a cursor was placed horizontally on the highest projection (the brightest part), and a cross-sectional profile corresponding to the cursor was displayed as a cross-sectional profile image.

(8) In the cross-sectional profile image, two cursors were each placed vertically on the inflection points at both sides of the projection, and the distance between the two cursors was used as the size of the projection.

(9) In the cross-sectional profile image, two cursors were each placed horizontally on the apex of the projection and two inflection points at both sides of the projection (the lower inflection point, in the case where the heights of two inflection points at both sides of the projection were different), and the distance between the two cursors were used as the height of the projection.

(10) The above procedure was repeated in the square outline of 1 cm×1 cm, and the number of projections with a size of 5 μm to 50 μm and a height of 0.5 μm to 3.0 μm was counted to determine the number of projections per 1 cm$^2$. Furthermore, the average height of the projections was determined.

3. 0° Peeling Strength of Modifying Porous Layer (N/15 mm)

FIG. 1 schematically shows the evaluation method. The number 1 represents a laminated sample; 2 represents a polyolefin porous membrane; 3 represents a modifying porous layer; 4 represents double-sided adhesive tape; 5 and 5' each represent an aluminum plate; and the arrow in the figure represents a tensile direction. To an aluminum plate 5 having a size of 50 mm×25 mm and a thickness of 0.5 mm, a double-sided adhesive tape (NW-K50 available from Nichiban Co., Ltd.) 4 having the same size was applied. A sample (1) (laminated porous membrane) cut out to 50 mm wide and 100 mm long was attached thereto with the side of a polyolefin porous membrane (2) facing the tape such that they were overlapped by 40 mm from one 25-meter-long side of the aluminum plate (5). The excess was cut away. Thereafter, double-sided adhesive tape was applied to one surface of an aluminum plate 5' 100 mm in length, 15 mm in width, and 0.5 mm in thickness, and attached to the aluminum plate 5 such that they were overlapped by 20 mm from the 25-meter-long side at the sample side. Thereafter, the aluminum plate 5 and the aluminum plate 5' with the sample sandwiched therebetween was mounted to a tensile tester (Autograph AGS-J manufactured by Shimadzu Corporation, load cell capacity: 1 kN). The aluminum plate 5 and the aluminum plate 5' were each pulled in parallel in the opposite direction at a tensile speed of 10 mm/min, and the strength was measured when the modifying porous layer was peeled off. This measurement was carried out on randomly selected three points at longitudinal intervals of 30 cm or more, and the average value was used as the 0° peeling strength of the modifying porous layer.

4. Membrane Thickness

The membrane thickness was determined by averaging measured values at 20 points obtained using a contact thickness meter ("Litematic" (registered trademark) series 318 manufactured by Mitsutoyo Corporation). The measurements were made using a superhard spherical gauge head with a diameter of 9.5 mm under the conditions of a load of 0.01 N.

5. Average Pore Size

The average pore size of a polyolefin porous membrane was measured by the following method. A sample was fixed onto a measuring cell using double-sided tape. Platinum or gold was vacuum-deposited for several minutes, and the surface of the membrane was observed by SEM at an appropriate magnification. Ten points were randomly selected on an image obtained by the SEM measurement, and the average value of the pore sizes at the 10 points was used as the average pore size of the sample.

6. Air Resistance (Sec/100 cc Air)

Using a Gurley densometer type B manufactured by Tester Sangyo Co., Ltd., a polyolefin porous membrane or a laminated porous membrane was fixed between a clamping plate and an adapter plate such that wrinkling did not occur, and the air resistance was measured in accordance with JIS P 8117. The sample used was 10-cm square, and measuring points were the center and four corners, five points in total, of the sample. The average value was used as the air resistance. When the length of a side of the sample is less than 10 cm, measured values at five points at intervals of 5 cm may be used.

The amount of increase in air resistance was determined by the following equation.

The amount of increase in air resistance (sec/100 cc Air)=$(Y)-(X)$

In the equation, (X) represents the air resistance (sec/100 cc Air) of a polyolefin porous membrane, and (Y) represents the air resistance (sec/100 cc Air) of a laminated porous membrane.

7. Porosity of Polyolefin Porous Membrane

A 10-cm square sample was prepared, and its sample volume ($cm^3$) and mass (g) were measured; the porosity (%) was calculated from the results using the following equation.

Porosity=$(1-mass/(resin density \times sample volume)) \times 100$

8. Scuff Resistance

The roll-shaped laminated porous membranes obtained in Examples and Comparative Examples were each unwound while being slit at both ends. The slitting was carried out using a slitter (Model WA177A manufactured by Nishimura Mfg. Co., Ltd.) under the conditions of a speed of 20 m/min and a tension of 60 N/100 mm. In the slitting process, two rolls plated with hard chromium (both of which were free rolls) were used as rolls that would come into contact with a coated surface. The roll-shaped laminated porous membrane after being slit was then visually observed while being rewound, and using a loupe with a magnifying power of 10× equipped with a scale (Peak Scale Loupe 10× available from Tohkai Sangyo Co., Ltd.), the number of peeling defects with a major axis of 0.5 mm or more of the modifying porous layer was counted and evaluated according to the following criteria. The evaluation area was 100 mm wide× 500 m long (when the width was less than 100 mm, the length was adjusted to attain the same evaluation area).

Criteria

Extremely good: 5 or less
Good: 6 to 15
Poor: 16 or more

Example 1

To 100 parts by weight of a composition (Mw/Mn=16.0) made of 2% by weight of an ultra high molecular weight polyethylene (UHMWPE) with a weight average molecular weight of 2,000,000 and 98% by weight of a high density polyethylene (HDPE) with a weight average molecular weight of 350,000, 0.375 part by weight of tetrakis-[methylene-(3',5'-di-t-butyl-4'-hydroxyphenyl)propionate]methane was added as an antioxidant to give a polyethylene composition (melting point: 135° C.). The polyethylene composition in an amount of 30 parts by weight was introduced into a twin-screw extruder. Via a side feeder of the twin-screw extruder, 70 parts by weight of liquid paraffin was fed and melt blended to prepare a polyethylene resin solution in the extruder. The polyethylene resin solution was then extruded at 190° C. through a die mounted at the tip of the extruder to an extrudate thickness of 825 μm, and taken up with a chill roll 800 mm in diameter, in which the temperature of cooling water was maintained at 25° C., to form a gel-like molding. In this process, one polyester doctor blade was put on the chill roll in parallel to the transverse direction of the gel-like molding at a location between where the gel-like molding separated from the chill roll and where the polyethylene resin solution extruded through the die and the chill roll came into contact, whereby the liquid paraffin adhering to the chill roll was scraped off. The gel-like molding was then subjected to simultaneous biaxial stretching to 5×5 times while controlling the temperature so as to achieve the desired air resistance to give a stretched molding. The stretched molding obtained was washed with methylene chloride to extract the residual liquid paraffin away and dried to give a porous molding. The porous molding was then fixed to a tenter, shrunk only in TD (transverse direction) by 10%, and heat-treated at 90° C. for 3 seconds to give a polyethylene porous membrane having a thickness of 16 μm, a porosity of 45%, an average pore size of 0.15 μm, and an air resistance of 240 sec/100 cc Air.

Polyvinyl alcohol (average degree of polymerization: 1,700, degree of saponification: 99% or more), alumina particles with an average diameter of 0.5 μm, and ion-exchanged water were mixed at a weight ratio of 6:54:40, and the resulting mixture was placed into a polypropylene container together with zirconium oxide beads ("Torayceram" (registered trademark) beads available from Toray Industries, Inc., diameter 0.5 mm), and dispersed for 6 hours using a paint shaker (manufactured by Toyo Seiki Seisaku-Sho, Ltd.). The dispersion was then filtered through a filter with a filtration limit of 5 μm to prepare a coating liquid (a).

The coating liquid (a) was applied to the above polyethylene porous membrane by gravure coating on the surface that had been in contact with the chill roll during film formation, and dried by being passed through a hot-air drying furnace at 50° C. for 10 seconds to give a laminated porous membrane with a final thickness of 18 μm.

Example 2

The same procedure as in Example 1 was repeated except that the mixing ratio of the ultra high molecular weight polyethylene (UHMWPE) with a weight average molecular weight of 2,000,000 to the high density polyethylene (HDPE) with a weight average molecular weight of 350,000 was changed to 10:90 (by wt %) to give a laminated porous membrane.

Example 3

The same procedure as in Example 1 was repeated except that the mixing ratio of the ultra high molecular weight polyethylene (UHMWPE) with a weight average molecular weight of 2,000,000 to the high density polyethylene (HDPE) with a weight average molecular weight of 350,000 was changed to 20:80 (by wt %) to give a laminated porous membrane.

Example 4

The same procedure as in Example 1 was repeated except that the mixing ratio of the ultra high molecular weight polyethylene (UHMWPE) with a weight average molecular weight of 2,000,000 to the high density polyethylene (HDPE) with a weight average molecular weight of 350,000 was changed to 30:70 (by wt %) to give a laminated porous membrane.

Example 5

The same procedure as in Example 1 was repeated except that the mixing ratio of the ultra high molecular weight polyethylene (UHMWPE) with a weight average molecular weight of 2,000,000 to the high density polyethylene (HDPE) with a weight average molecular weight of 350,000 was changed to 40:60 (by wt %) to give a laminated porous membrane.

Example 6

The same procedure as in Example 1 was repeated except that two polyester doctor blades were put on the chill roll at intervals of 20 mm to give a laminated porous membrane.

Example 7

The same procedure as in Example 1 was repeated except that three polyester doctor blades were put on the chill roll at intervals of 20 mm to give a laminated porous membrane.

Example 8

A two-part curable aqueous acrylic urethane resin (solid component concentration: 45% by mass) composed of aqueous acrylic polyol and water-dispersible polyisocyanate (hardener), alumina particles with an average diameter of 0.5 µm, and ion-exchanged water were mixed at a weight ratio of 10:40:50, and the resulting mixture was placed into a polypropylene container together with zirconium oxide beads ("Torayceram" (registered trademark) beads available from Toray Industries, Inc., diameter 0.5 mm), and dispersed for 6 hours using a paint shaker (manufactured by Toyo Seiki Seisaku-Sho, Ltd.). The dispersion was then filtered through a filter with a filtration limit of 5 µm to prepare a coating liquid (b). The coating liquid (b) was laminated to the polyethylene porous membrane of Example 1 as a modifying porous layer in the same manner as in Example 1 to give a laminated porous membrane with a final thickness of 18 µm.

Example 9

A copolymer of polyvinyl alcohol, acrylic acid, and methyl methacrylate ("POVACOATR" (registered trademark), available from Nisshin Kasei Co., Ltd.), alumina particles with an average diameter of 0.5 µm, and a solvent (ion-exchanged water:ethanol=70:30) were mixed at a weight ratio of 5:45:50, and the resulting mixture was placed into a polypropylene container together with zirconium oxide beads ("Torayceram" (registered trademark) beads available from Toray Industries, Inc., diameter 0.5 mm), and dispersed for 6 hours using a paint shaker (manufactured by Toyo Seiki Seisaku-Sho, Ltd.). The dispersion was then filtered through a filter with a filtration limit of 5 µm to prepare a coating liquid (c). The coating liquid (c) was applied to the polyethylene porous membrane of Example 1 in the same manner as in Example 1 to give a laminated porous membrane with a final thickness of 18 µm.

Example 10

The same procedure as in Example 1 was repeated except that the temperature of cooling water in the chill roll was maintained at 35° C. to give a laminated porous membrane.

Example 11

The same procedure as in Example 1 was repeated except that the extrusion rate of the polyethylene resin solution was adjusted such that the resulting polyethylene porous membrane had a thickness of 20 µm to give a laminated porous membrane with a final thickness of 22 µm.

Example 12

The same procedure as in Example 1 was repeated except that the extrusion rate of the polyethylene resin solution was adjusted such that the resulting polyethylene porous membrane had a thickness of 12 µm to give a laminated porous membrane with a final thickness of 14 µm.

Example 13

The same procedure as in Example 1 was repeated except that the extrusion rate of the polyethylene resin solution was adjusted such that the resulting polyethylene porous membrane had a thickness of 9 µm to give a laminated porous membrane with a final thickness of 11 µm.

Example 14

The same procedure as in Example 1 was repeated except that 26 parts by weight of the polyethylene composition was introduced into a twin-screw extruder, and 74 parts by weight of liquid paraffin was fed via a side feeder of the twin-screw extruder and melt blended to give a laminated porous membrane.

Example 15

The same procedure as in Example 1 was repeated except that 35 parts by weight of the polyethylene composition was introduced into a twin-screw extruder, and 65 parts by weight of liquid paraffin was fed via a side feeder of the twin-screw extruder and melt blended to give a laminated porous membrane.

Example 16

The same procedure as in Example 1 was repeated except that a coating liquid (d), which was obtained using titanium oxide particles (average diameter: 0.38 µm) in place of alumina particles, was used to give a laminated porous membrane.

Example 17

The same procedure as in Example 1 was repeated except that a coating liquid (e), which was obtained using plate-like boehmite microparticles (average diameter: 1.0 μm) in place of alumina particles, was used to give a laminated porous membrane.

Example 18

The same procedure as in Example 8 was repeated except that a coating liquid (f), which was obtained using barium sulfate microparticles (average diameter: 0.3 μm) in place of alumina particles, was used to give a laminated porous membrane.

Comparative Example 1

The same procedure as in Example 1 was repeated except that when the polyethylene resin solution extruded through the die was cooled with a chill roll to form a gel-like molding, the liquid paraffin adhering to the chill roll was not scraped off without using a doctor blade to give a laminated porous membrane.

Example 19

An acrylic emulsion (available from Showa Denko K.K.; Polysol AT-731 (solid component concentration: 47% by mass)), alumina particles with an average diameter of 0.5 μm, and ion-exchanged water were mixed at a weight ratio of 10:40:50, and the resulting mixture was placed into a polypropylene container together with zirconium oxide beads ("Torayceram" (registered trademark) beads available from Toray Industries, Inc., diameter 0.5 mm), and dispersed for 6 hours using a paint shaker (manufactured by Toyo Seiki Seisaku-Sho, Ltd.). The dispersion was then filtered through a filter with a filtration limit of 5 μm to prepare a coating liquid (g). The coating liquid (g) was laminated to the polyethylene porous membrane of Example 1 as a modifying porous layer in the same manner as in Example 1 to give a laminated porous membrane with a final thickness of 18 μm.

Comparative Example 2

The same procedure as in Example 1 was repeated except that a polyethylene composition (melting point: 135° C.) obtained by adding 0.375 parts by weight of tetrakis-[methylene-(3',5'-di-t-butyl-4'-hydroxyphenyl)propionate]methane as an antioxidant to 100 parts by weight of a composition (Mw/Mn=16.0) made of 100% by weight of a high density polyethylene (HDPE) with a weight average molecular weight of 350,000 was used to give a laminated porous membrane.

Comparative Example 3

The same procedure as in Example 1 was repeated except that the temperature of cooling water in the chill roll was maintained at 0° C., and no doctor blade was used to give a laminated porous membrane.

Comparative Example 4

The same procedure as in Example 1 was repeated except that the polyethylene resin solution extruded through the die was not cooled with a chill roll but immersed in water maintained at 25° C. for 1 minute to give a laminated porous membrane.

Comparative Example 5

Fifty parts by weight of the polyethylene composition used in Example 1 was introduced into a twin-screw extruder, and 50 parts by weight of liquid paraffin was fed via a side feeder of the twin-screw extruder and melt blended to prepare a polyethylene resin solution in the extruder. The polyethylene resin solution was extruded through the die but could not be extruded in the form of a uniform membrane.

Comparative Example 6

The same procedure as in Example 1 was repeated except that the temperature of cooling water in the chill roll was maintained at 50° C. to give a laminated porous membrane.

Comparative Example 7

Into a four-necked flask equipped with a thermometer, a condenser, and a nitrogen gas introduction tube, 1 mol of trimellitic anhydride (TMA), 0.8 mol of o-tolidine diisocyanate (TODI), 0.2 mol of 2,4-tolylene diisocyanate (TDI), and 0.01 mol of potassium fluoride were introduced together with N-methyl-2-pyrrolidone to a solid component concentration of 14% and stirred at 100° C. for 5 hours, and then the resulting mixture was diluted with N-methyl-2-pyrrolidone to a solid component concentration of 14% to synthesize a polyamide-imide resin solution.

The polyamide-imide resin solution, alumina particles with an average diameter of 0.5 μm, and N-methyl-2-pyrrolidone were mixed at a weight ratio of 26:34:40, and the resulting mixture was placed into a polypropylene container together with zirconium oxide beads ("Torayceram" (registered trademark) beads available from Toray Industries, Inc., diameter: 0.5 mm), and dispersed for 6 hours using a paint shaker (manufactured by Toyo Seiki Seisaku-Sho, Ltd.). The dispersion was then filtered through a filter with a filtration limit of 5 μm to prepare a coating liquid (f). The coating liquid (f) was applied to a polyolefin porous membrane, which was obtained in the same manner as in Example 1, by gravure coating similarly to Example 1 to give a laminated porous membrane with a final thickness of 18 μm.

The properties of the polyolefin porous membranes and the laminated porous membranes obtained in Examples 1 to 17 and Comparative Examples 1 to 7 are shown in Table 1.

TABLE 1

| | Manufacturing conditions | | | | | | |
|---|---|---|---|---|---|---|---|
| | UHMWPE (wt %) | HDPE (wt %) | Resin concentration (parts by weight) | Chill roll temperature (° C.) | Scraping off of molding solvent (blade numbers) | Coating solution | Tensile strength of binder (N/mm$^2$) |
| Example 1 | 2 | 98 | 30 | 25 | 1 | a | 8 |
| Example 2 | 10 | 90 | 30 | 25 | 1 | a | 8 |

TABLE 1-continued

|  |  |  |  |  |  |  |  |
|---|---|---|---|---|---|---|---|
| Example 3 | 20 | 80 | 30 | 25 | 1 | a | 8 |
| Example 4 | 30 | 70 | 30 | 25 | 1 | a | 8 |
| Example 5 | 40 | 60 | 30 | 25 | 1 | a | 8 |
| Example 6 | 2 | 98 | 30 | 25 | 2 | a | 8 |
| Example 7 | 2 | 98 | 30 | 25 | 3 | a | 8 |
| Example 8 | 2 | 98 | 30 | 25 | 1 | b | 20 |
| Example 9 | 2 | 98 | 30 | 25 | 1 | c | 31 |
| Example 10 | 2 | 98 | 30 | 35 | 1 | a | 8 |
| Example 11 | 2 | 98 | 30 | 25 | 1 | a | 8 |
| Example 12 | 2 | 98 | 30 | 25 | 1 | a | 8 |
| Example 13 | 2 | 98 | 30 | 25 | 1 | a | 8 |
| Example 14 | 2 | 98 | 26 | 25 | 1 | a | 8 |
| Example 15 | 2 | 98 | 35 | 25 | 1 | a | 8 |
| Example 16 | 2 | 98 | 30 | 25 | 1 | d | 8 |
| Example 17 | 2 | 98 | 30 | 25 | 1 | e | 8 |
| Example 18 | 2 | 98 | 30 | 25 | 1 | f | 8 |
| Example 19 | 2 | 98 | 30 | 25 | 1 | g | 19 |
| Comparative Example 1 | 2 | 98 | 30 | 25 | 0 | a | 8 |
| Comparative Example 2 | 0 | 100 | 30 | 25 | 1 | a | 8 |
| Comparative Example 3 | 2 | 98 | 30 | 0 | 0 | a | 8 |
| Comparative Example 4 | 2 | 98 | 30 | 25° C. (water bath) | — | a | 8 |
| Comparative Example 5 | 2 | 98 | 50 | — | — | — | 8 |
| Comparative Example 6 | 2 | 98 | 30 | 50 | 1 | a | 8 |
| Comparative Example 7 | 2 | 98 | 30 | 25 | 1 | f | 2 |

| | Properties | | | | | | | |
|---|---|---|---|---|---|---|---|---|
| | Thickness of polyolefin porous membrane (μm) | Air resistance of polyolefin porous membrane (X) (sec/100 ccAir) | Air resistance of laminated porous membrane (Y) (sec/100 ccAir) | Amount of increase in air resistance [(Y) − (X)] (sec/100 ccAir) | Number of projections (numbers/cm²) | Average projection height (μm) | 0* peering strength (N/15 mm) | Scuff resistance |
| Example 1 | 16 | 240 | 290 | 50 | 14 | 2.8 | 180 | excellent |
| Example 2 | 16 | 252 | 293 | 41 | 17 | 1.1 | 177 | excellent |
| Example 3 | 16 | 260 | 298 | 38 | 19 | 0.8 | 173 | excellent |
| Example 4 | 16 | 273 | 306 | 33 | 42 | 0.6 | 177 | excellent |
| Example 5 | 16 | 95 | 136 | 41 | 126 | 0.5 | 156 | excellent |
| Example 6 | 16 | 240 | 290 | 50 | 16 | 2.9 | 189 | excellent |
| Example 7 | 16 | 240 | 292 | 52 | 17 | 2.9 | 194 | excellent |
| Example 8 | 16 | 240 | 289 | 49 | 14 | 2.8 | 186 | excellent |
| Example 9 | 16 | 240 | 290 | 50 | 14 | 2.8 | 203 | excellent |
| Example 10 | 16 | 240 | 334 | 94 | 12 | 2.6 | 177 | excellent |
| Example 11 | 20 | 250 | 305 | 55 | 12 | 2.9 | 177 | excellent |
| Example 12 | 12 | 170 | 219 | 49 | 18 | 1.0 | 174 | excellent |
| Example 13 | 9 | 220 | 263 | 43 | 20 | 0.6 | 165 | excellent |
| Example 14 | 16 | 228 | 271 | 43 | 11 | 2.5 | 177 | excellent |
| Example 15 | 16 | 250 | 298 | 48 | 19 | 2.9 | 183 | excellent |
| Example 16 | 16 | 245 | 295 | 50 | 14 | 2.8 | 165 | excellent |
| Example 17 | 16 | 243 | 301 | 58 | 14 | 2.8 | 188 | excellent |
| Example 18 | 16 | 240 | 288 | 48 | 14 | 2.8 | 187 | excellent |
| Example 19 | 16 | 240 | 289 | 49 | 14 | 2.8 | 185 | excellent |
| Comparative Example 1 | 16 | 239 | 289 | 50 | 0 | — | 98 | bad |
| Comparative Example 2 | 16 | 238 | 283 | 45 | 0 | — | 97 | bad |
| Comparative Example 3 | 16 | 240 | 283 | 43 | 0 | — | 95 | bad |
| Comparative Example 4 | 16 | 241 | 301 | 60 | 2 | 0.6 | 99 | good |
| Comparative Example 5 | — | — | — | — | — | — | — | — |
| Comparative Example 6 | 16 | 241 | 295 | 54 | 0 | — | 95 | bad |
| Comparative Example 7 | 16 | 240 | 288 | 48 | 14 | 2.8 | 120 | good |

DESCRIPTION OF SYMBOLS

1: Laminated porous membrane
2: Polyolefin porous membrane
3: Modifying porous layer
4: Double-sided adhesive tape
5: Aluminum plate
6: Crystalline nucleus of polyethylene spherulite 7: Die
8: Polyolefin resin solution
9: Chill roll
10: Doctor blade
11: Gel-like molding

The invention claimed is:

1. A laminated porous membrane, comprising:
a polyolefin porous membrane, on one surface of which projections that are made of a polyolefin and satisfy 5 μm≤W≤50 μm (W: projection size) and 0.5 μm≤H≤3.0 μm (H: projection height) are irregularly and without periodicity scattered at a density of $3/cm^2$ to $200/cm^2$, wherein the projections are not formed by embossing, and
a modifying porous layer laminated on the surface of the polyolefin porous membrane having the projections, wherein the modifying porous layer comprises a binder with a tensile strength of at least 5 $N/mm^2$ and inorganic particles.

2. The laminated porous membrane according to claim 1, wherein the binder is polyvinyl alcohol or an acrylic resin.

3. The laminated porous membrane according to claim 1, wherein the inorganic particles comprise at least one selected from the group consisting of calcium carbonate, alumina, titania, barium sulfate, and boehmite.

4. A battery separator comprising the laminated porous membrane according to claim 1.

5. A method of producing the laminated porous membrane according to claim 1, comprising:
(a) adding a molding solvent to a polyethylene resin, and then performing melt blending to prepare a polyethylene resin solution;
(b) extruding the polyethylene resin solution through a die, and cooling the extruded polyethylene resin solution with a chill roll having a surface from which the molding solvent has been removed to form a gel-like molding;
(c) stretching the gel-like molding in the machine direction and the transverse direction to provide a stretched molding;
(d) extracting the molding solvent away from the stretched molding, followed by drying to provide a porous molding;
(e) heat-treating the porous molding to provide a polyolefin porous membrane; and,
(f) forming a laminated membrane on a surface that has been in contact with the chill roll using a coating liquid comprising a binder with a tensile strength of at least 5 $N/mm^2$, inorganic particles, and a solvent that is capable of dissolving or dispersing the binder, followed by drying.

6. The method of producing the laminated porous membrane according to claim 5, wherein the means for removing the molding solvent in the step (b) is a doctor blade.

* * * * *